B. FORD.
SECONDARY OR STORAGE BATTERY.
APPLICATION FILED JAN. 29, 1915.

1,271,690.

Patented July 9, 1918.
3 SHEETS—SHEET 1.

WITNESSES:
Rob't R Mitchel
Frank C French

INVENTOR
Bruce Ford
BY
Augustus B. Stoughton
ATTORNEY.

UNITED STATES PATENT OFFICE.

BRUCE FORD, OF PHILADELPHIA, PENNSYLVANIA.

SECONDARY OR STORAGE BATTERY.

1,271,690. Specification of Letters Patent. Patented July 9, 1918.

Application filed January 29, 1915. Serial No. 5,002.

*To all whom it may concern:*

Be it known that I, BRUCE FORD, a citizen of the United States, residing at Philadelphia, in the county of Philadelphia and State of Pennsylvania, have invented certain new and useful Improvements in Secondary or Storage Batteries, of which the following is a specification.

The principal objects of the present invention are, first, to provide a secondary or storage battery especially adapted for use on board of boats or ships and therefore adapted to meet the requirements and conditions of that kind of service; second, to provide a storage battery which can be assembled complete and readily and easily installed in that condition on a boat or ship; and third, to provide a storage battery in which the parts are so combined and arranged that the battery or cell will withstand the movements and the strains thereof incident to its loading and use upon a ship or boat.

The invention will be claimed at the end hereof but will be first described in connection with the embodiment of it chosen for illustration in the accompanying drawings in which—

Figure 1:
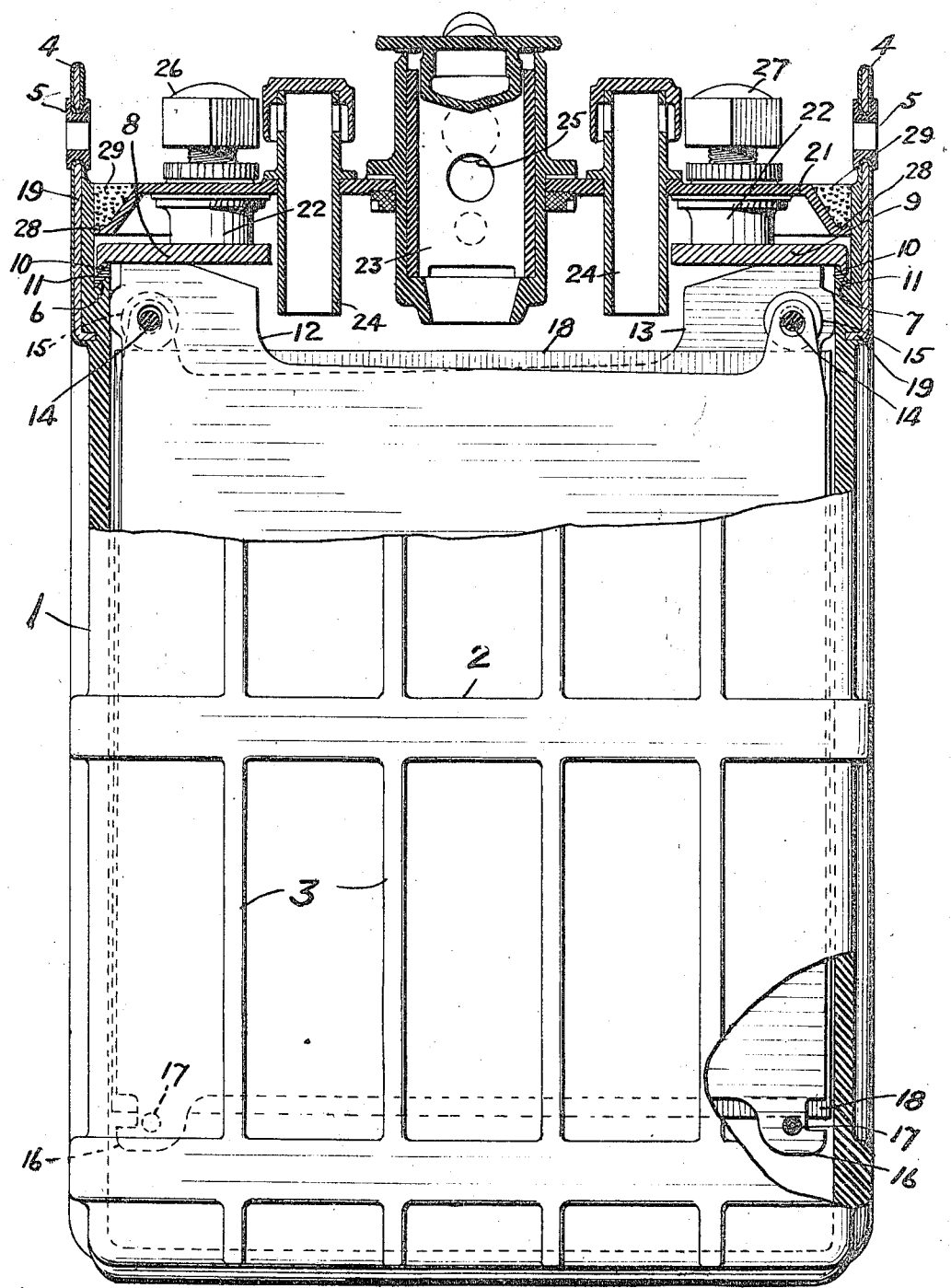
Figure 1, is a side view, partly in section of a storage battery or storage battery cell embodying features of the invention.
Figure 2:
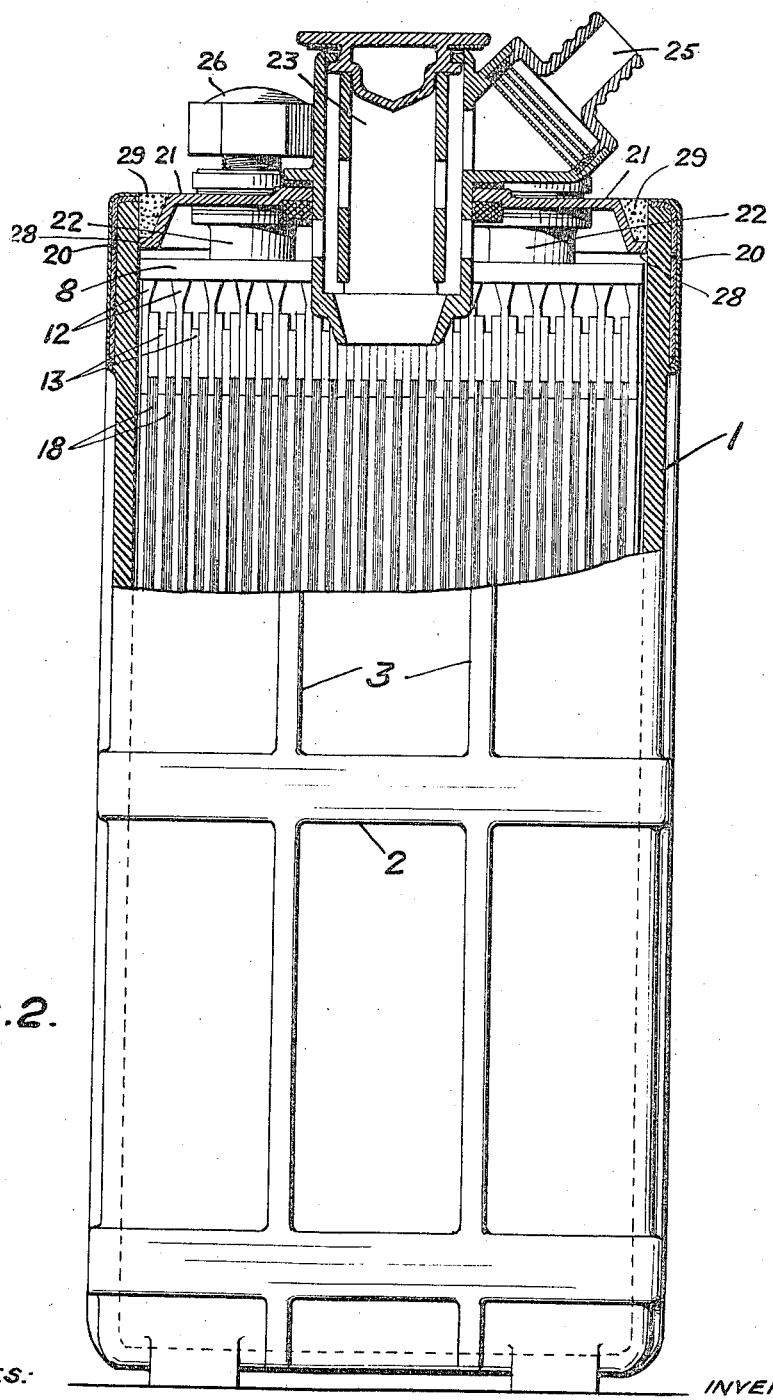
Fig. 2, is an end view of the same, partly in section.
Figure 3:
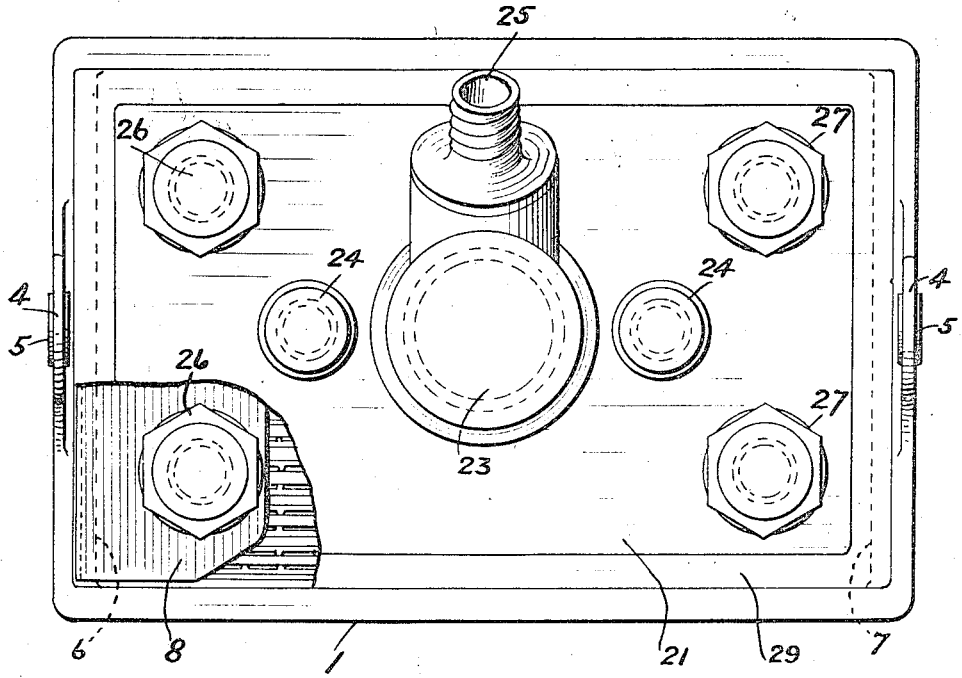
Fig. 3, is a top view of the same with parts broken away.
Figure 4:
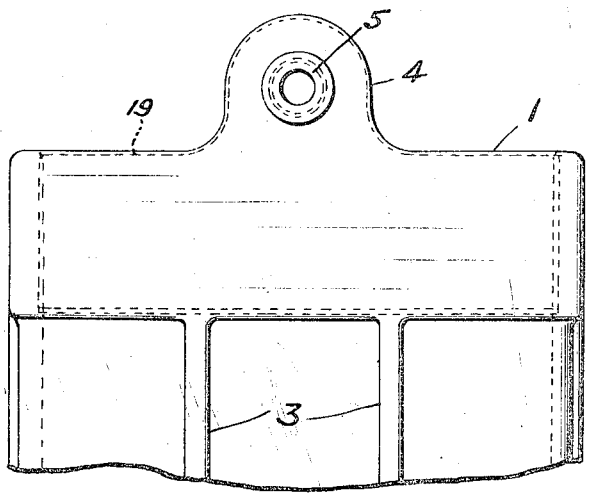
Fig. 4, is an end view of the top part of the cell.

1, is a jar or container provided with transverse and longitudinal externally arranged reinforcing ribs 2, and 3. The jar is made of rubber or like material and such material as a class is not rigid or strong but is flexible and yielding. There is an advantage, however, in using nothing but the jar and dispensing with such boxes as are usually employed to contain, protect and support it. The advantage is a saving in room which on a ship or boat means more plates or active elements and hence more capacity. The jar 1, is provided with upstanding ears 4. These ears are provided with openings which are lined with soft rubber or like gromets or linings 5. The ears, or more accurately the gromets, afford means for connecting the jar with hooks or other gear by which it can be loaded and unloaded. Internally the jar is provided with oppositely disposed upwardly beveled seats 6 and 7, Fig. 1. 8 and 9, are bus bars having hook-like feet 10, supported upon said seats, as shown through the intervention of soft rubber or like cushions 11. The plates 12, of like polarity are suspended at one side from one bus bar as 8, and plates 13, of like but opposite polarity are suspended at one side from the bus bar 9. The other sides of the plates are suspended from rods 14, insulated or of insulating material which pass through all the plates and may be provided with insulators 15, between the plates. 16, are laterally arranged projections at the lower parts of the plates and through them pass rods 17, that support separators 18. 19 and 20, are flanged reinforcements in the material of the jar walls and they are arranged for coöperation with the ears 4, and seats 6 and 7, and the other top portions of the jar so as to properly take and distribute stresses and strains. The flanges of the reinforcements 19, extend inward under the seats 6 and 7, and the reinforcements extend upward into the ears and around their openings, so that the weight of the plates and bus bars on the seats is referred to the reinforcements 19. The flanges of the reinforcements 20, are at the top and extend inward in which position they are well adapted to perform the reinforcing and strengthening function. The reinforcements which are embedded in the jar walls hold them up to the rim 28, of the cover 21 and so insure in connection with the sealing compound 29 a tight joint. If the cell is subjected to rocking motion, the seats 6 and 7, in coöperation with the foot 10, on the bus bars 8 and 9, operate to prevent undesirable movement of the plates or elements and such movement of the plates or elements is also opposed by the projection 16, coming in contact with the jar walls. 21, is a dished cover and it is spaced from the bottom of the jar through the posts 22, which are carried from the bus bars 8 and 9, and by the seats 6 and 7. 23 and 24, are filling means, and 25 is a vent outlet. 26 and 27 are terminal connections and they are arranged in such a way that the cells can be connected upside or endwise, clear of the ears 4.

It will be obvious to those skilled in the art that modifications may be made in details of construction and arrangement without departing from the spirit of the invention, hence the latter is not limited as to such matters or further than the prior state of the art may require.

I claim:

1. A storage battery for boats and the like comprising the combination of a transversely and longitudinally ribbed jar of rubber or like material provided with upstanding ears and with oppositely disposed inclined seats, bus bars having hook-like feet resting upon said seats, plates of like polarity suspended at one side from each bus bar, rods supported by the plates and from which the plates are suspended, laterally arranged projections at the lower parts of the plates, and flanged reinforcements in the material of the jar walls arranged for coöperation with the ears and seats, substantially as described.

2. A storage battery for boats and the like comprising the combination of a jar provided with upstanding ears and with oppositely disposed inclined seats, bus bars having feet resting upon said seats, plates of like polarity suspended at one side from each bus bar, rods supported by the plates and from which the other sides of the plates are suspended, projections at the lower parts of the plates, and flanged reinforcements in the material of the jar walls arranged for coöperation with the ears and seats, substantially as described.

3. A storage battery for boats and the like comprising the combination of a jar provided with upstanding ears and with oppositely disposed inclined seats, bus bars having feet resting upon said seats, plates of like polarity suspended at one side from each bus bar, rods supported by the plates and from which the other sides of the plates are suspended, projections at the lower parts of the plates, flanged reinforcements in the material of the jar walls arranged for coöperation with the ears and seats, and cushions between the seats and bus bar feet, substantially as described.

4. A storage battery for boats and the like comprising the combination of a jar provided with upstanding ears and with oppositely disposed inclined seats, bus bars having feet resting upon said seats, plates of like polarity suspended at one side from each bus bar, rods supported by the plates and from which the other sides of the plates are suspended, projections at the lower parts of the plates, flanged reinforcements in the material of the jar walls arranged for coöperation with the ears and seats, separators between the plates, and separator supporting bars carried by the projections, substantially as described.

5. In a storage battery the combination of a jar having in its wall and integral therewith an upwardly inclined seat, and a hooklike plate supporting foot coöperating with the seat to hold the jar wall toward the plate structure by the action of the weight thereof.

6. In a storage battery the combination of a jar having a seat and an upstanding ear, plates carried by the seat, and a flanged reinforcement embedded in the jar wall and underlying the seat and extending into the ear, substantially as described.

7. In a storage battery the combination of a jar having two oppositely disposed seats, bus bars seated respectively on said seats, plates of like polarity suspended at one side from each bus bar, and supporting rods from which the plates are suspended at the other side, substantially as described.

8. In a storage battery a jar, a cover having its rim opposed to the jar wall, and a metal reinforcement embedded in the jar wall to hold it up to the rim of the cover to maintain a tight joint, substantially as described.

In testimony whereof I have hereunto signed my name.

BRUCE FORD.

Witnesses:
CLIFFORD K. CASSEL,
FRANK E. FRENCH.